United States Patent
Todderud et al.

(10) Patent No.: US 12,501,861 B2
(45) Date of Patent: Dec. 23, 2025

(54) DRAPER BELT ASSEMBLY FOR AN AGRICULTURAL HARVESTER HEADER

(71) Applicant: CNH Industrial America LLC, New Holland, PA (US)

(72) Inventors: Stephen Todderud, Lancaster, PA (US); Benjamin Kemmerer, Hamburg, PA (US)

(73) Assignee: CNH Industries America LLC, New Holland, PA (US)

( * ) Notice: Subject to any disclaimer, the term of this patent is extended or adjusted under 35 U.S.C. 154(b) by 609 days.

(21) Appl. No.: 17/919,044

(22) PCT Filed: Apr. 14, 2021

(86) PCT No.: PCT/US2021/027374
§ 371 (c)(1),
(2) Date: Oct. 14, 2022

(87) PCT Pub. No.: WO2021/211774
PCT Pub. Date: Oct. 21, 2021

(65) Prior Publication Data
US 2023/0232743 A1  Jul. 27, 2023

Related U.S. Application Data

(60) Provisional application No. 63/009,676, filed on Apr. 14, 2020.

(51) Int. Cl.
*A01D 61/02* (2006.01)
*A01D 57/20* (2006.01)
*A01D 34/14* (2006.01)

(52) U.S. Cl.
CPC .............. *A01D 61/02* (2013.01); *A01D 57/20* (2013.01); *A01D 34/14* (2013.01)

(58) Field of Classification Search
CPC .......... A01D 61/02; A01D 57/20; A01D 34/14
See application file for complete search history.

(56) References Cited

U.S. PATENT DOCUMENTS

| 2,987,169 A | 6/1961 | Hinchcliffe |
| 7,543,428 B1 * | 6/2009 | Puryk .................... A01D 57/20 |
| | | 430/127 |

(Continued)

FOREIGN PATENT DOCUMENTS

| CA | 2620501 A1 | 11/2008 |
| CA | 2722897 A1 | 11/2009 |

(Continued)

OTHER PUBLICATIONS

International Search Report and Written Opinion for PCT Application No. PCT/US2021/027374 dated Jul. 8, 2021 (13 pages).

*Primary Examiner* — Claude J Brown
(74) *Attorney, Agent, or Firm* — Buchanan Ingersoll & Rooney PC (57) ABSTRACT

A draper belt assembly for an agricultural harvester header (100) comprising an endless draper belt (120) that includes an outer surface (322) and an inner surface (324) opposite the outer surface. The draper belt further includes elongated members (326) each extending from the outer surface and having a lateral face (328) substantially facing a longitudinal midline (ML) of the endless draper belt. The draper belt assembly additionally comprises a drive mechanism (332) operatively engaged with the endless draper belt. The lateral faces of the elongated members act as shelves that inhibit sliding of grain and other crop material from the bottom of the belt, thereby reducing plugging at the bottom of the belt adjacent the cutter bar and floor sheets. In addition, the elongated members more evenly distribute grain and other crop material across the width of the belt.

21 Claims, 8 Drawing Sheets

(56) References Cited

U.S. PATENT DOCUMENTS

| | | | |
|---|---|---|---|
| 7,958,711 B1* | 6/2011 | Sauerwein | A01D 57/20 56/181 |
| 8,272,199 B2 | 9/2012 | Sauerwein et al. | |
| 2002/0175055 A1* | 11/2002 | Ryde | B65G 15/42 198/690.2 |
| 2007/0193243 A1* | 8/2007 | Schmidt | A01D 43/06 56/181 |
| 2007/0238565 A1* | 10/2007 | Marler | B65G 15/34 474/237 |
| 2008/0271426 A1 | 11/2008 | Lohrentz et al. | |
| 2008/0276591 A1* | 11/2008 | Tippery | A01D 61/02 56/181 |
| 2011/0094201 A1* | 4/2011 | Bomleny | A01D 61/02 56/181 |
| 2015/0195993 A1* | 7/2015 | Hasenour | A01D 57/20 56/153 |
| 2016/0345497 A1* | 12/2016 | Hasenour | A01D 57/20 |
| 2018/0257866 A1* | 9/2018 | Echtenkamp | B65G 15/34 |
| 2018/0265300 A1* | 9/2018 | Johnson | B65G 15/34 |
| 2018/0271018 A1* | 9/2018 | Hoffman | A01D 61/002 |
| 2018/0352743 A1 | 12/2018 | Hasenour et al. | |

FOREIGN PATENT DOCUMENTS

| | | |
|---|---|---|
| CN | 1036889 C | 1/1998 |
| DE | 1057963 B | 5/1959 |
| DE | 1065772 B | 9/1959 |
| EP | 2896283 A2 | 7/2015 |

* cited by examiner

DRAPER BELT ASSEMBLY FOR AN AGRICULTURAL HARVESTER HEADER

The exemplary embodiments of present invention relate generally to a header of a plant cutting machine (e.g., a combine harvester) and, more specifically, to a draper belt assembly for an agricultural harvester header that includes a draper belt having structural features that reduce crop material from sliding down the belt towards the ground and which promotes even distribution of crop material across the width of the belt.

BACKGROUND OF THE INVENTION

An agricultural harvester e.g., a plant cutting machine, such as, but not limited to, a combine or a windrower, generally includes a header operable for severing and collecting plant or crop material as the harvester is driven over a crop field. The header has a plant cutting mechanism, e.g., a cutter bar, for severing the plants or crops via, for example, an elongate sickle mechanism that reciprocates sidewardly relative to a non-reciprocating guard structure. After crops are cut, they are collected inside the header and transported via a conveyor such as a draper belt towards a feederhouse located centrally inside the header.

During operations, a lateral draper belt conveyor is typically upwardly inclined from its forward edge to its rearward edge. Conventional lateral draper belts of such conveyors are smooth and employ a grain saver to prevent crop material such as grains from rolling off the bottom of the belt. Consequently, crop material collects at the bottom of the draper belt adjacent the cutter bar and floor sheets of the header resulting in plugging of the header with crop material in these regions.

SUMMARY OF THE INVENTION

In accordance with an exemplary embodiment there is provided a draper belt assembly for an agricultural harvester header comprising an endless draper belt that includes an outer surface and an inner surface opposite the outer surface. The draper belt further includes elongated members each extending from the outer surface and having a lateral face substantially facing a longitudinal midline of the endless draper belt. The draper belt assembly additionally comprises a drive mechanism operatively engaged with the endless draper belt.

An aspect of the exemplary embodiment is that each of the elongated members is a prism that includes a first sloped lateral face substantially facing a lateral side of the draper belt and a second sloped lateral face substantially facing the longitudinal midline of the endless draper belt.

Another aspect of the exemplary embodiment is that the elongated members comprise a first plurality of prism-shaped elongated members having a major face substantially facing the longitudinal midline of the endless draper belt, and a second plurality of prism-shaped elongated members having a major face facing the major face of the first plurality of prism-shaped elongated members.

Another aspect of the exemplary embodiment is that the endless draper belt further comprises an elongated lug extending from the outer surface, and wherein a longitudinal axis of the elongated lug extends in a direction transverse to a longitudinal axis of at least one of the elongated members. According to an aspect, the elongated lug traverses a longitudinal midline of the elongated members at a non-perpendicular angle.

In accordance with the exemplary embodiments, there is provided a draper belt assembly for an agricultural harvester header. When the subject disclosure is used in combination with an agricultural harvester, the disclosure overcomes the disadvantages referenced above by providing an endless draper belt including elongated members each extending from the outer surface and having a lateral face substantially facing a longitudinal midline of the endless draper belt. The lateral faces of the elongated members act as shelves or retaining bars that inhibit sliding of grain and other crop material to the bottom of the draper belt, thereby reducing plugging at the bottom of the belt adjacent the cutter bar and floor sheets. In addition, the lateral faces of the elongated members more evenly distribute grain and other crop material across the width of the draper belt.

Other features and advantages of the subject disclosure will be apparent from the following more detail description of the exemplary embodiments.

BRIEF DESCRIPTION OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DRAWINGS

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject application is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Figure 1:
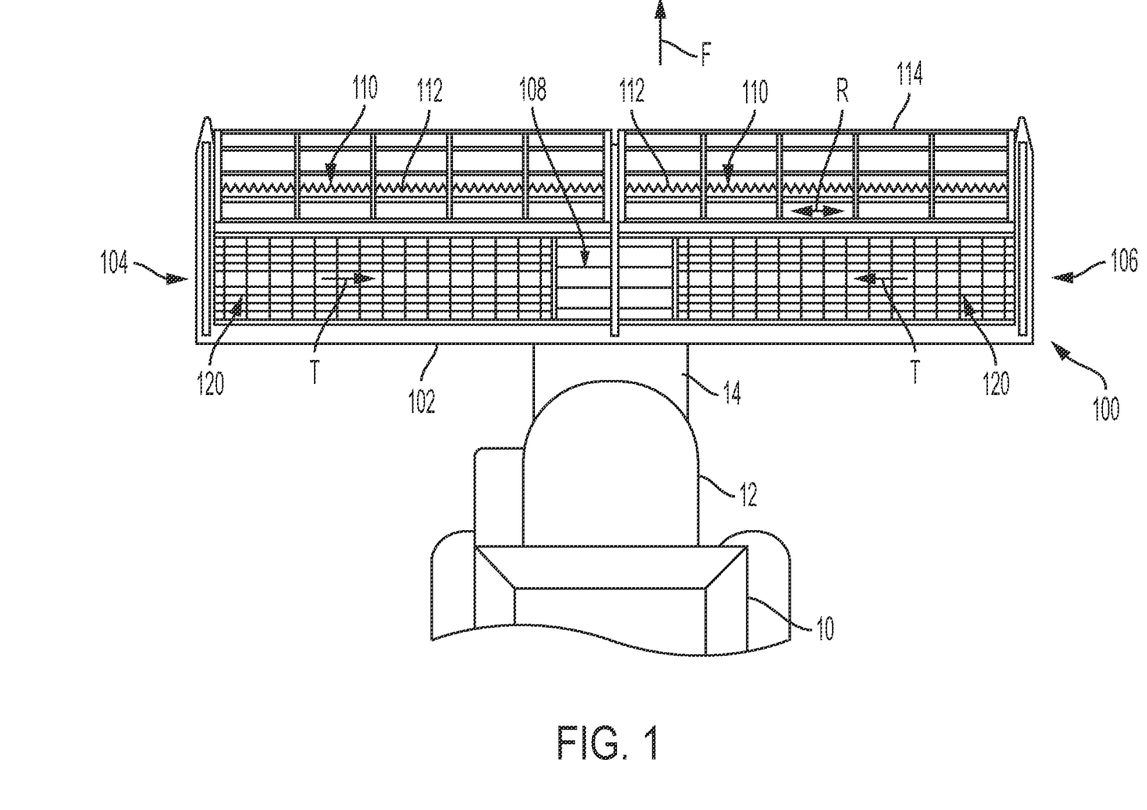
FIG. 1 is a top view of an agricultural harvester and a header in accordance with an exemplary embodiment of the subject disclosure.
Figure 2:
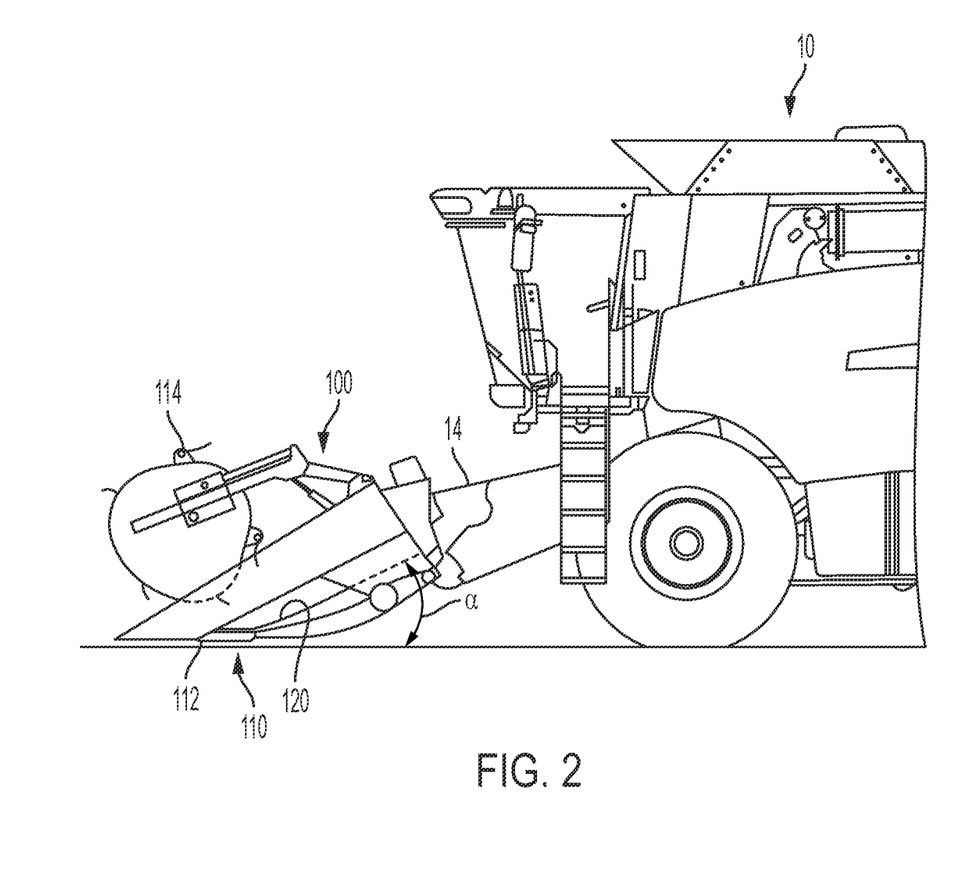
FIG. 2 is a side view of the agricultural harvester and header of FIG. 1.

Referring now to the drawings, and more particularly to FIGS. 1 and 2, there is shown an exemplary embodiment of an agricultural vehicle 10 in the form of, e.g., a combine harvester or agricultural harvester which generally includes a chassis 12, a feeder housing or feederhouse 14, and an attachment in the form of a header 100. Typically, the agricultural harvester 10 will include additional internal systems for the separation and handling of collected crop material. However, these additional systems are not essential for a full and proper understanding of the subject disclosure.

It should be appreciated that the draper belt described and illustrated herein does not necessarily need to be included on combine harvesters, but can be incorporated in other agricultural vehicles or devices having draper belts.

The header 100 is coupled to, and supported by, the chassis 12 of the agricultural vehicle 10 by, for example, coupling to the feeder housing 14. In the exemplary embodiment shown, the header 100 is in the form of a draper header to harvest bushy or fluffy crop material. The draper header 100 has a frame 102 coupled to the chassis 12 by coupling to the feeder housing 14 and a pair of opposed lateral ends 104, 106. The draper header 100 may support one or more flexible cutter bar assemblies 110 with reciprocating knives 112 to cut crop material as the agricultural vehicle 10 travels in a forward direction, denoted by arrow F. The reciprocating knives 112, which may be referred to as cutting elements, can be reciprocated back-and-forth in a lateral direction, denoted by arrow R, relative to the forward direction F in a known manner, e.g., by a wobble box, epicyclic drive, etc. Exemplary cutting elements applicable to the present exemplary embodiments are disclosed, e.g., in U.S. Pat. Nos. 7,730,709 and 8,151,547, the entire disclosures of which are incorporated by reference herein in their entirety for all purposes.

The draper header 100 may further include a center feed belt 108 or a center auger that conveys the crop material into the feeder housing 14. The draper header 100 may also include one or more lateral, flexible draper belts 120 that are positioned rearwardly of the cutter bar assemblies 110 and travel, e.g. rotate, in opposing directions of travel, denoted by each arrow "T", in order to convey crop material inwardly to the center feed belt 108 and thereby the feeder housing 14. The header 100 may also include a rotating reel 114 with tines or the like to sweep the crop material inwardly towards the draper belts 120. As best shown in FIG. 2, the draper belts 120 are upwardly inclined from their forward edge to their rearward edge at an angle "α" of about 5 to 12 degrees including, e.g. 3, 4, 6, 7, 8, 9, 10, 11, 13, 14 and 15 degrees, relative to horizontal.

Figure 3:
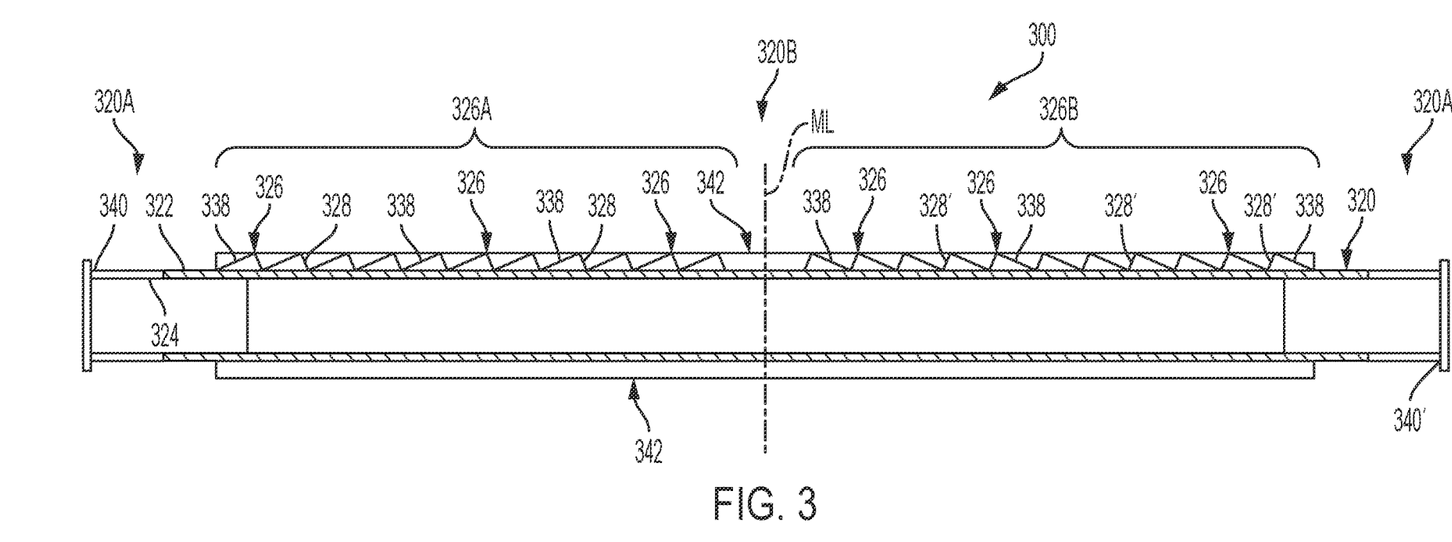
FIG. 3 is an end view in partial cross-section of a draper belt assembly including an endless draper belt in accordance with an exemplary embodiment of the subject disclosure.
Figure 4:
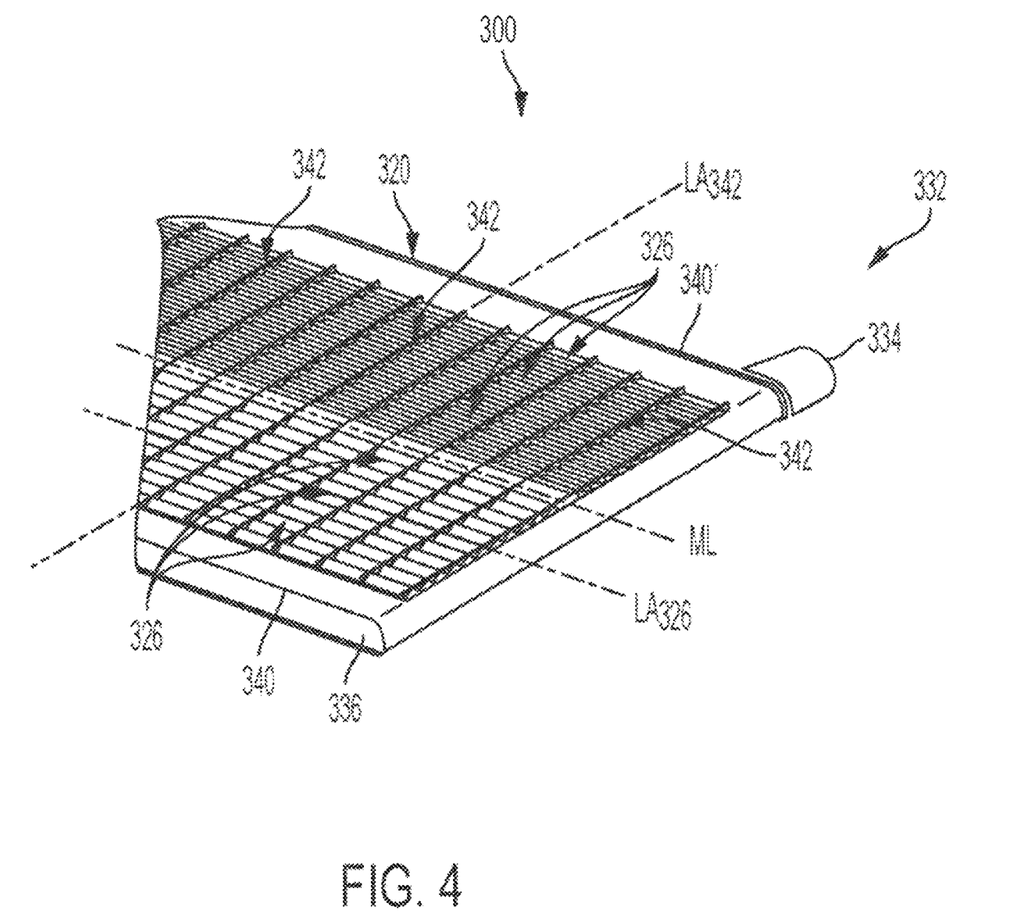
FIG. 4 is a partial top perspective view of a portion of the draper belt assembly of FIG. 3.

Referring to FIGS. 3 and 4, there is shown a draper belt assembly 300 constructed in accordance with an exemplary embodiment of the subject disclosure. The draper belt assembly 300 comprises an endless draper belt 320 including an outer surface 322 and an inner surface 324 opposite the outer surface. The endless draper belt further includes elongated members 326 each extending from the outer surface 322 and having a lateral face 328 substantially facing a longitudinal midline "ML" of the endless draper belt.

The draper belt additionally comprises a drive mechanism 332 (FIG. 4) operatively engaged with the endless draper belt. By way of example, but not limitation, the drive mechanism may be a suitable electric, hydraulic or mechanical motor 334 drivingly connected to an end of a first roller (or drive roller) 336 about which the draper belt 320 is entrained. Although not illustrated, it is understood that the draper belt assembly includes a second roller (or driven roller) spaced from the first roller 336 and about which the draper belt is also entrained.

As shown in FIG. 3, the elongated members 326 are substantially parallel to each other on the draper belt and each of the elongated members is a prism or prism-shaped. The prism-shaped elongated member includes a first sloped lateral face 338 substantially facing a lateral side of the draper belt 320. The prism-shaped elongated member further includes a second sloped lateral face or major face 328 substantially facing the longitudinal midline ML or 320B of the endless draper belt. As used herein, "major face" shall mean a steeper face of the elongated member, a medially facing side of the elongated member, or a shelf-like crop material supporting face of the elongated member 326 that inhibits sliding of grain and other crop material toward the bottom or forward end of the sloped draper belt, thereby reducing plugging at the bottom of the draper belt adjacent the cutter bar and floor sheets. The major faces of the elongated member more evenly distribute grain and other crop material across the width of the draper belt. According to an aspect, the first sloped lateral face 338 has a length from the prism apex greater than a length of the second sloped lateral face or major face 328.

In accordance with an exemplary aspect of the present disclosure, as best shown in FIG. 3, the elongated members 326 comprise a first plurality of prism-shaped elongated members 326A each having a major face 328 substantially facing the longitudinal midline ML of the endless draper belt. The elongated members 326 further comprise a second plurality of prism-shaped elongated members 326B each having a major face 328' substantially facing the major faces 328 of the first plurality of prism-shaped elongated members.

According to an aspect, the first plurality 326A of the elongated members 326 comprise at least ten elongated members and are spaced from a lateral edge 340 of the endless draper belt. Likewise, the second plurality 326B of the elongated members 326 comprise at least ten elongated members and are spaced from a lateral edge 340' of the endless draper belt.

Figure 3A:
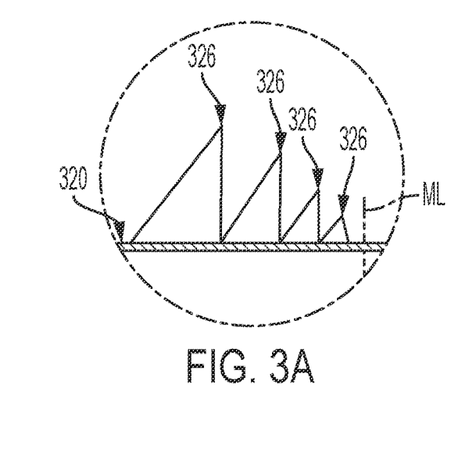
FIG. 3A is an enlarged view of an alternative construction of an endless draper belt in accordance with an exemplary embodiment of the subject disclosure.

The elongated members extend from the outer surface 322 of the endless draper belt a height of about 5 to 15 mm, including 3, 4, 5, 6, 7, 8, 9, 10, 11, 12, 13, 14, 16, 17 and 18 mm. Additionally, the elongated members can all be the same height or of varying height, e.g. the height of adjacent elongated members can increase the further they are positioned from the midline ML of the endless draper belt (see FIG. 3A). According to a further aspect, the elongated members can be integrally formed with (e.g., molded directly with the endless belt) or releasably attachable (e.g., via fasteners) to the endless draper belt.

According to the subject disclosure, the endless draper belt further comprises an elongated lug 342 extending from the outer surface 322 of the endless draper belt. A longitudinal axis "$LA_{342}$" of the elongated lug extends in a direction transverse to a longitudinal axis "$LA_{326}$" of at least one of the elongated members 326 (FIG. 4). In the illustrated embodiment, the endless draper belt 320 comprises a plurality of spaced apart lugs 342 extending from the outer surface 322 of the endless draper belt, and the longitudinal axis $LA_{342}$ of each of the elongated lugs extends in a direction transverse to the longitudinal axis $LA_{326}$ of at least one of the elongated members 326.

According to an aspect, the elongated lugs extend from the outer surface 322 of the endless draper belt a height of about 5 to 20 mm, including 3, 4, 6, 7, 8, 9, 10, 11, 12, 13, 14, 15, 16, 17, 18, 19, 21, 22 and 23 mm. According to a further aspect, the elongated lugs can be integrally formed with (e.g., molded directly with the endless belt) or releasably attachable (e.g., via fasteners) to the endless draper belt.

Figure 5:
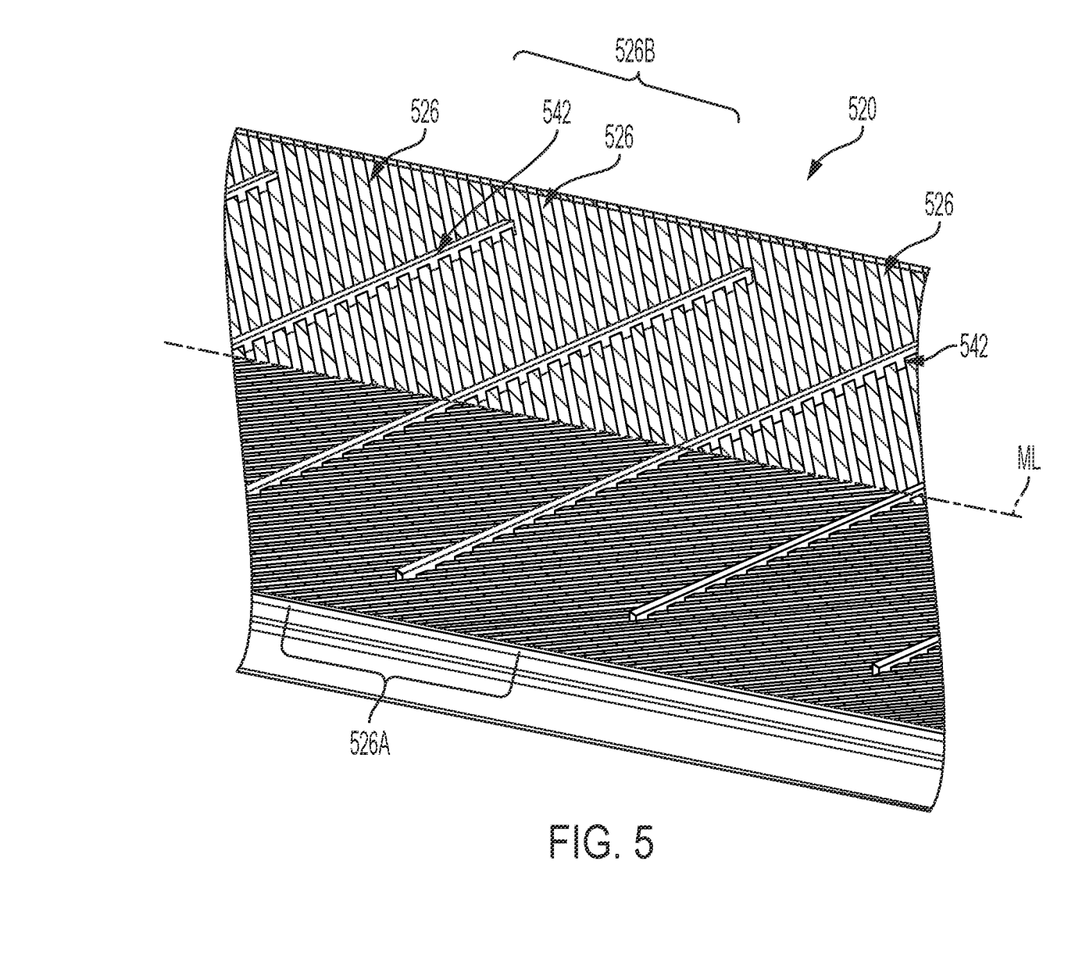
FIG. 5 is a partial top perspective view of a portion of a draper belt assembly including an endless draper belt in accordance with another exemplary embodiment of the subject disclosure.
Figure 6:
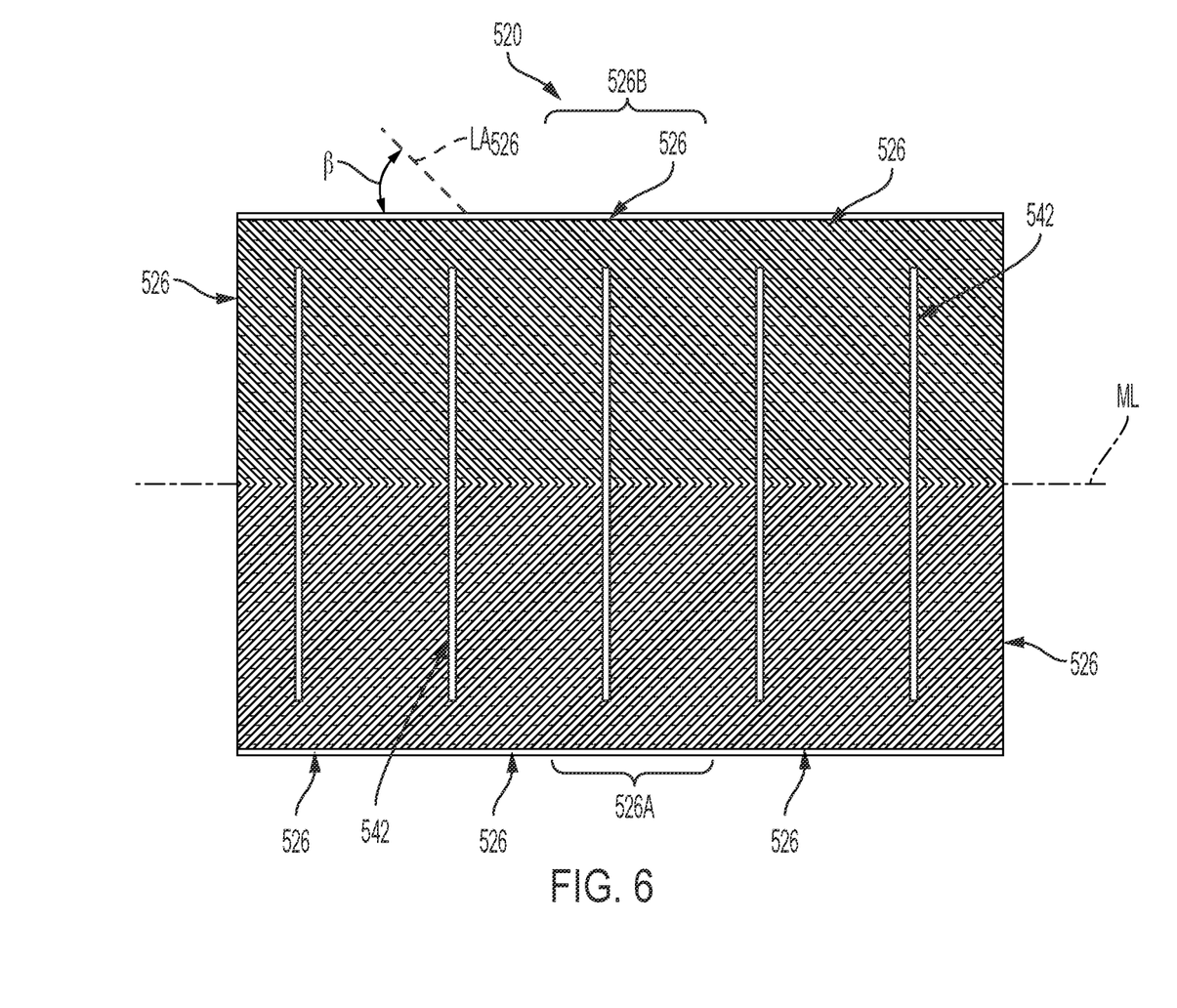
FIG. 6 is a partial top plan view of the endless draper belt of FIG. 5.

Referring to FIGS. 5 and 6, there is shown an endless draper belt 520 constructed in accordance with another exemplary embodiment of the subject disclosure. According to this exemplary embodiment, the draper belt comprises a plurality of elongated members 526 wherein at least one of the elongated members has a longitudinal axis "$LA_{526}$" extending in a direction traversing the longitudinal midline ML of the endless belt at a non-perpendicular angle "β" of about 30 to 60 degrees, including 15, 20, 25, 35, 40, 45, 50, 55, 65, 70 and 75 degrees. As best shown in FIG. 6, the elongated members comprise a first plurality of elongated members 526A and a second plurality of elongated members 526B. Collectively, the first and second plurality of elongated members form a substantially V-shaped configuration in plan view.

In addition, the endless draper belt 520 comprises a plurality of spaced apart lugs 542 extending from the outer surface of the endless draper belt. The elongated lugs can be integrally formed with (e.g., molded directly with the endless belt) or releasably attachable (e.g., via fasteners) to the endless draper belt. In addition, the lugs 542 extend substantially transverse to the midline ML of the endless belt 520 (FIG. 6) and bisect the elongated members 526. In so doing, the lugs 542 establish a repeating pattern of the substantially V-shaped configuration of the first and second plurality of elongated members 526A, 526B along the midline ML of the endless belt 520.

Figure 7:
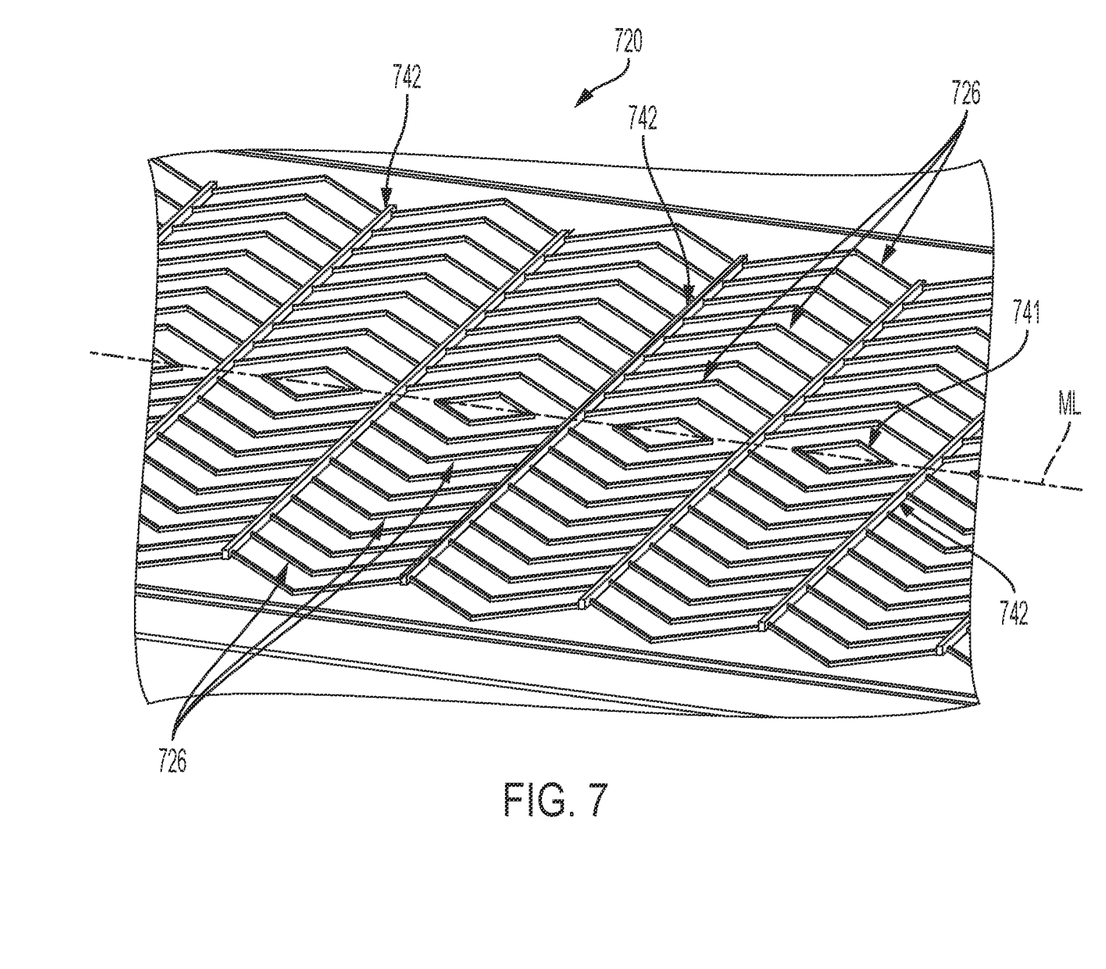
FIG. 7 is a partial top perspective view of a portion of a draper belt assembly including an endless draper belt in accordance with yet another exemplary embodiment of the subject disclosure.
Figure 8:
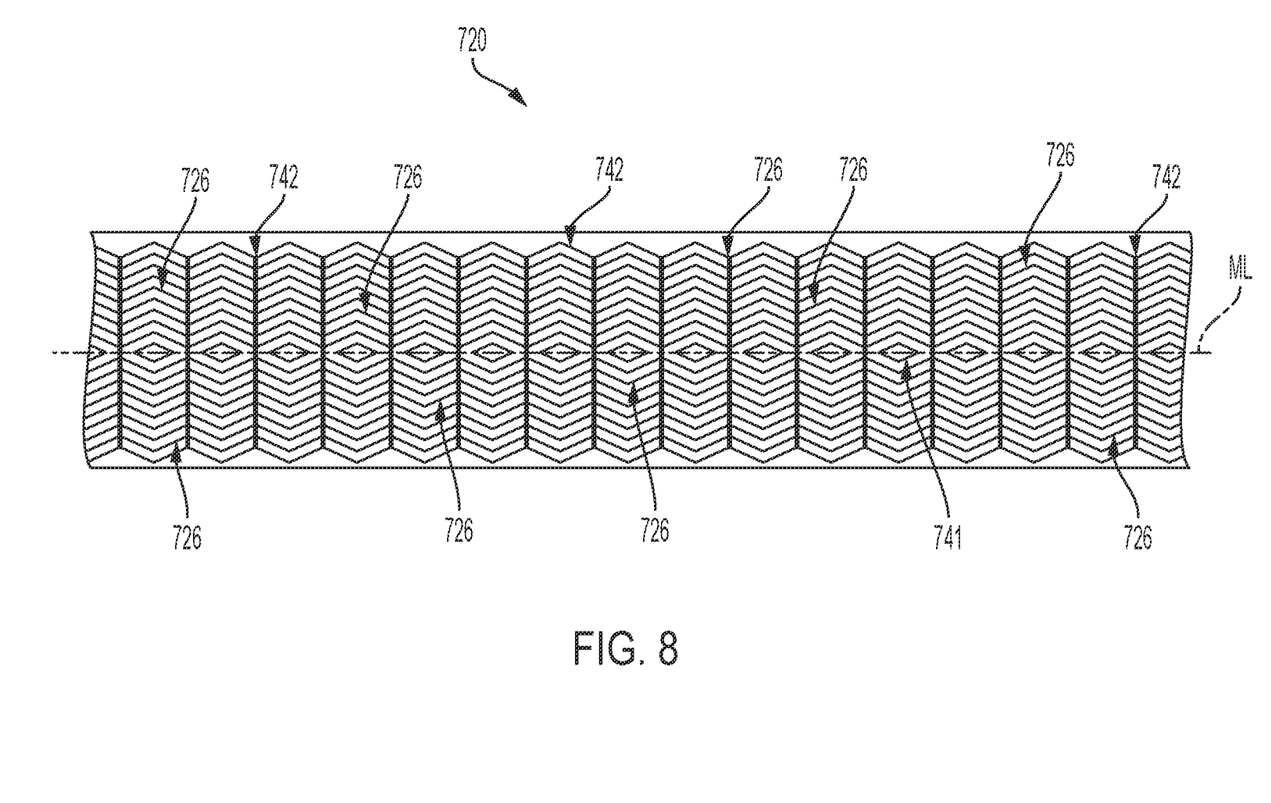
FIG. 8 is a partial top plan view of the endless draper belt of FIG. 7.

Referring to FIGS. 7 and 8, there is shown an endless draper belt 720 constructed in accordance with another exemplary embodiment of the subject disclosure. According to this exemplary embodiment, the draper belt comprises a plurality of elongated members 726. The elongated members form a substantially diamond-shaped configuration 741 in plan view about the midline ML of the endless draper belt 720. Additionally, other elongated members 726 are arranged to form a chevron shape emanating the substantially diamond shaped configuration 741.

Further, the endless draper belt 720 comprises a plurality of spaced apart lugs 742 extending from the outer surface of the endless draper belt. The elongated lugs can be integrally formed with (e.g., molded directly with the endless belt) or releasably attachable (e.g., via fasteners) to the endless draper belt. In addition, the lugs 742 extend substantially transverse to the midline ML of the endless belt 720 and bisect the elongated members 726. In so doing, the lugs 742 establish a repeating pattern of the substantially diamond-shaped configuration 741 and the chevron shape of the elongated members 726 along the length of the endless belt 720.

It will be appreciated by those skilled in the art that changes could be made to the exemplary embodiments described above without departing from the broad inventive concept thereof. It is to be understood, therefore, that this disclosure is not limited to the particular embodiments disclosed, but it is intended to cover modifications within the spirit and scope of the subject disclosure as defined by the appended claims.

We claim:

1. A draper belt assembly for an agricultural harvester header comprising:
   an endless draper belt that includes:
   an outer surface,
   an inner surface opposite the outer surface,
   a longitudinal midline, and
   elongated members arranged symmetrically to each other on opposing sides of the longitudinal midline, each elongated member extending from the outer surface and having a lateral face (i) oriented either parallel or oblique to the longitudinal midline of the endless draper belt and (ii) substantially facing the longitudinal midline of the endless draper belt; and
   a drive mechanism operatively engaged with the endless draper belt.

2. The draper belt assembly of claim 1, wherein each of the elongated members are substantially parallel to each other.

3. The draper belt assembly of claim 1, wherein each of the elongated members is a prism.

4. The draper belt assembly of claim 1, wherein each of the elongated members is a prism that includes a first sloped lateral face substantially facing a lateral side of the draper belt and a second sloped lateral face substantially facing the longitudinal midline of the endless draper belt.

5. The draper belt assembly of claim 4, wherein the first sloped lateral face has a length greater than a length of the second sloped lateral face.

6. The draper belt assembly of claim 1, wherein the elongated members comprise:
 a first plurality of prism-shaped elongated members arranged on one side of the longitudinal midline and each having a major face substantially facing the longitudinal midline of the endless draper belt; and
 a second plurality of prism-shaped elongated members arranged on an opposing side of the longitudinal midline and each having a major face substantially facing the major faces of the first plurality of prism-shaped elongated members.

7. The draper belt assembly of claim 1, wherein the endless draper belt further comprises an elongated lug extending from the outer surface, and wherein a longitudinal axis of the elongated lug extends in a direction transverse to a longitudinal axis of at least one of the elongated members.

8. The draper belt assembly of claim 7, wherein the elongated lug traverses a longitudinal midline of the elongated members at a non-perpendicular angle.

9. The draper belt assembly of claim 7, wherein the elongated lug has a height of about 5 to 20 mm.

10. The draper belt assembly of claim 1, wherein the endless draper belt further comprises a plurality of spaced apart elongated lugs extending from the outer surface, and wherein a longitudinal axis of the elongated lugs extend in a direction transverse to a longitudinal axis of at least one of the elongated members.

11. The draper belt assembly of claim 1, wherein the elongated members comprise at least ten elongated members.

12. The draper belt assembly of claim 1, wherein the elongated members extend from the outer surface a height of about 5 to 15 mm.

13. The draper belt assembly of claim 1, wherein the elongated members are integrally formed with the endless draper belt.

14. The draper belt assembly of claim 1, wherein the elongated members are releasably attachable to the endless draper belt.

15. The draper belt assembly of claim 1, wherein the elongated members are spaced from a lateral edge of the endless draper belt.

16. The draper belt assembly of claim 1, wherein at least one of the elongated members has a longitudinal axis extending in a direction traversing the longitudinal midline of the endless belt at a non-perpendicular angle.

17. The draper belt assembly of claim 1, wherein the elongated members form a substantially V-shaped configuration having an apex at the longitudinal midline of the endless belt.

18. The draper belt assembly of claim 1, wherein the elongated members form a substantially diamond-shaped configuration centered about the longitudinal midline of the endless belt.

19. A header for an agricultural harvester comprising:
 a cutter bar extending in a widthwise direction of the header; and
 the draper belt assembly of claim 1.

20. The draper belt assembly of claim 1, wherein the elongated members have varying heights.

21. The draper belt assembly of claim 1, wherein each lateral face is oriented parallel to the longitudinal midline of the endless draper belt.

* * * * *